(12) United States Patent
Huang et al.

(10) Patent No.: US 6,621,242 B2
(45) Date of Patent: Sep. 16, 2003

(54) MOTOR SPEED CONTROL CIRCUIT HAVING A SYNCHRONOUS PWM SIGNAL

(75) Inventors: Biing-Huang Huang, Taipei (TW); Wen-Chi Lin, Nan Tou (TW); Shiang-Hwua Yu, Taipei Hsien (TW); Hsu-Yuan Chin, Hsinchu (TW)

(73) Assignee: Silicon Touch Technology Inc., Hsinchu (TW)

( * ) Notice: Subject to any disclaimer, the term of this patent is extended or adjusted under 35 U.S.C. 154(b) by 156 days.

(21) Appl. No.: 09/966,433

(22) Filed: Oct. 1, 2001

(65) Prior Publication Data

US 2003/0062863 A1 Apr. 3, 2003

(51) Int. Cl.$^7$ ................................................. H02P 7/00
(52) U.S. Cl. ........................ 318/268; 318/721; 318/600; 318/605; 318/608; 318/599
(58) Field of Search .............................. 318/721, 268, 318/600, 601, 602, 603, 606, 608, 599

(56) References Cited

U.S. PATENT DOCUMENTS

| | | | | |
|---|---|---|---|---|
| 5,122,719 A | * | 6/1992 | Bessenyei et al. | 318/629 |
| 5,327,064 A | * | 7/1994 | Arakawa et al. | 318/801 |
| 5,642,461 A | * | 6/1997 | Lewis | 388/812 |
| 5,663,616 A | * | 9/1997 | Stringfellow et al. | 318/254 |
| 5,850,130 A | * | 12/1998 | Fujisaki et al. | 318/439 |

* cited by examiner

Primary Examiner—Rita Leykin
(74) Attorney, Agent, or Firm—Venable LLP; Fei-Fei Chao

(57) ABSTRACT

A motor speed control having synchronous PWM signals has a synchronous phase detecting unit and a PWM control unit. The synchronous phase detecting unit detects the phase variation of a Hall signal, which represents the phase change of the motor, and outputs a digital value to the PWM control unit. The PWM control unit compares the digital value with a speed control command so as to obtain a PWM signal, wherein the PWM signal is synchronized with the Hall signal. Since the PWM signal is synchronized with the Hall signal, the motor is operated smoothly even in the low speed rotation, and audible noises are effectively reduced.

7 Claims, 7 Drawing Sheets

MOTOR SPEED CONTROL CIRCUIT HAVING A SYNCHRONOUS PWM SIGNAL

BACKGROUND OF THE INVENTION

1. Field of Invention

The invention relates to a motor speed control circuit and, in particular to a motor speed control circuit having a synchronous pulse width modulation (PWM) signal, which is able to control the motor to operate smoothly such that audible noise is effectively reduced.

2. Related Art

To reduce the power consumed in coils of a DC motor or a brushless fan, pulse width modulation (PWM) control techniques are now used in place of linear driving techniques. By applying PWM control techniques to the DC motor, the coils of the motor are efficiently driven, and the power consumption is able to be kept at a minimum.

With reference to FIG. 7, the Hall signal responds to the rotation speed of the motor, i.e., if the rotation speed increases, the frequency of the Hall signal becomes higher. Conventionally, the frequency of a PWM control signal is a constant, and the frequency of the PWM control signal is different from the Hall signal, therefore the PWM control signal is not synchronized with the Hall signal. Thus, audible noise is generated when the motor is operated, especially at low speed.

To overcome the shortcomings, the present invention provides a motor speed control circuit having a synchronous PWM signal to effectively mitigate and obviate the aforementioned problems.

SUMMARY OF THE INVENTION

The objective of the invention is to provide a motor speed control circuit having a synchronous PWM signal to effectively reduce audible noise when the motor is operating.

To achieve the foregoing objective, the PWM control circuit mainly comprises a synchronous phase detecting unit and a PWM control unit to generate a synchronous control signal applied to the motor.

Other objects, advantages and novel features of the invention will become more apparent from the following detailed description when taken in conjunction with the accompanying drawings.

DETAILED DESCRIPTION OF THE INVENTION

Figure 1:
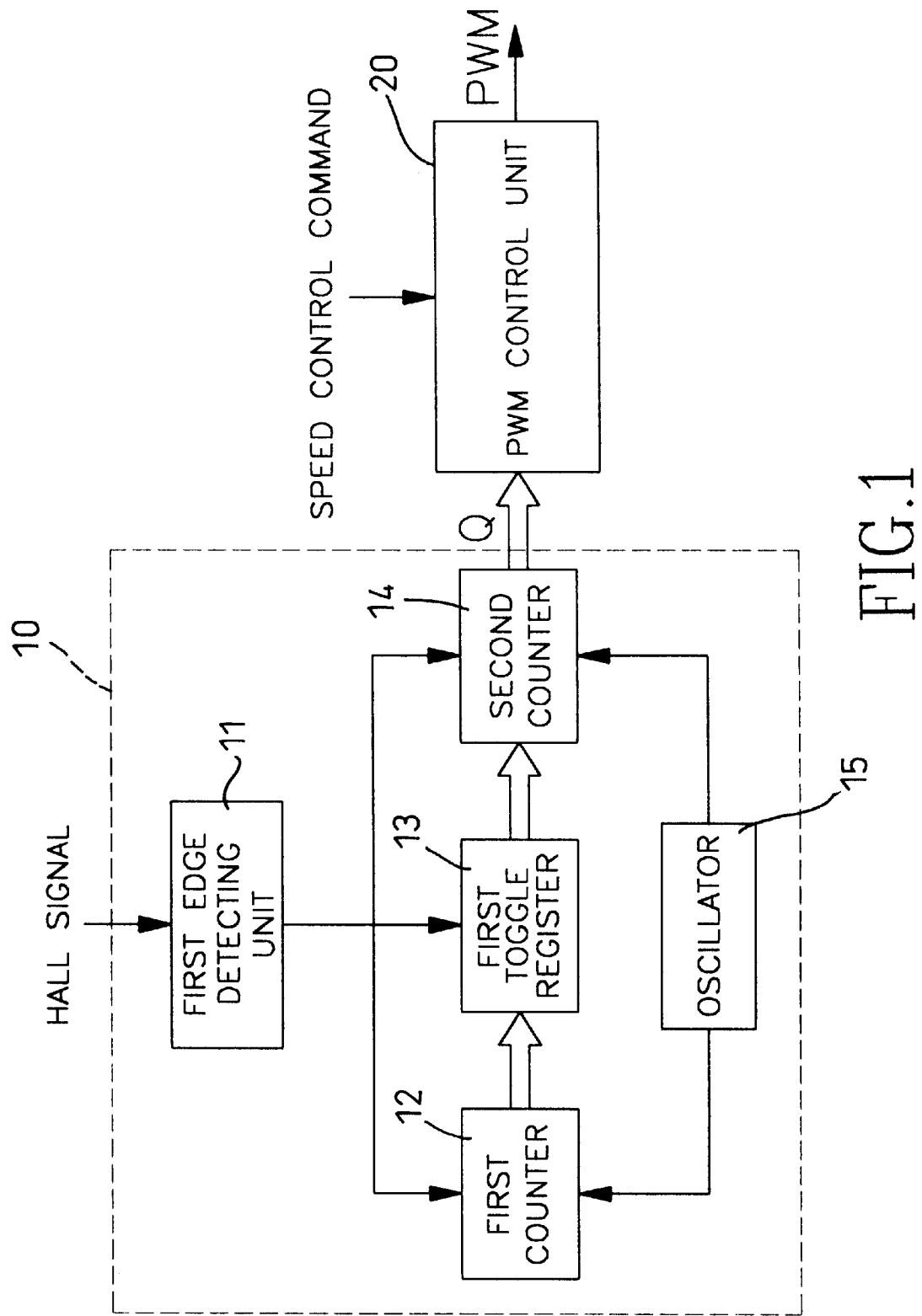
FIG. 1 is a block diagram of a synchronous phase detecting unit and a PWM control unit in accordance with the present invention.

With reference to FIG. 1, a motor speed control circuit of the invention mainly comprises a synchronous phase detecting unit (10) and a pulse width modulation (PWM) control unit (20). The synchronous phase detecting unit (10) comprises a first edge detecting unit (11), a first counter (12), a first toggle register (13), a second counter (14) and an oscillator (15). For the purpose of explaining this invention, the second counter (14) is a three-bit counter, which means the output digital value of the second counter (14) is in binary form, i.e. 000, 001 to 111. By changing the number of bits in the second counter (14), different resolutions are obtainable in the motor speed control circuit.

The first edge detecting unit (11) receives a Hall signal and detects the phase changes of the coils of the motor based on the Hall signal. The first edge detecting unit (11) is connected with the first counter (12), the first toggle register (13) and the second counter (14). The oscillator (15) is connected to and provides clock signals to the first and the second counter (12, 14).

The first counter (12) is set to count once per N clock signals, and for the purpose of explaining this invention, N is set at 8, wherein N is a constant value. Thus when the first counter (12) is activated, the first counter (12) starts to count every eighth clock signal. For example, when 56 clock signals have elapsed, the counter records 7.

Figure 5:
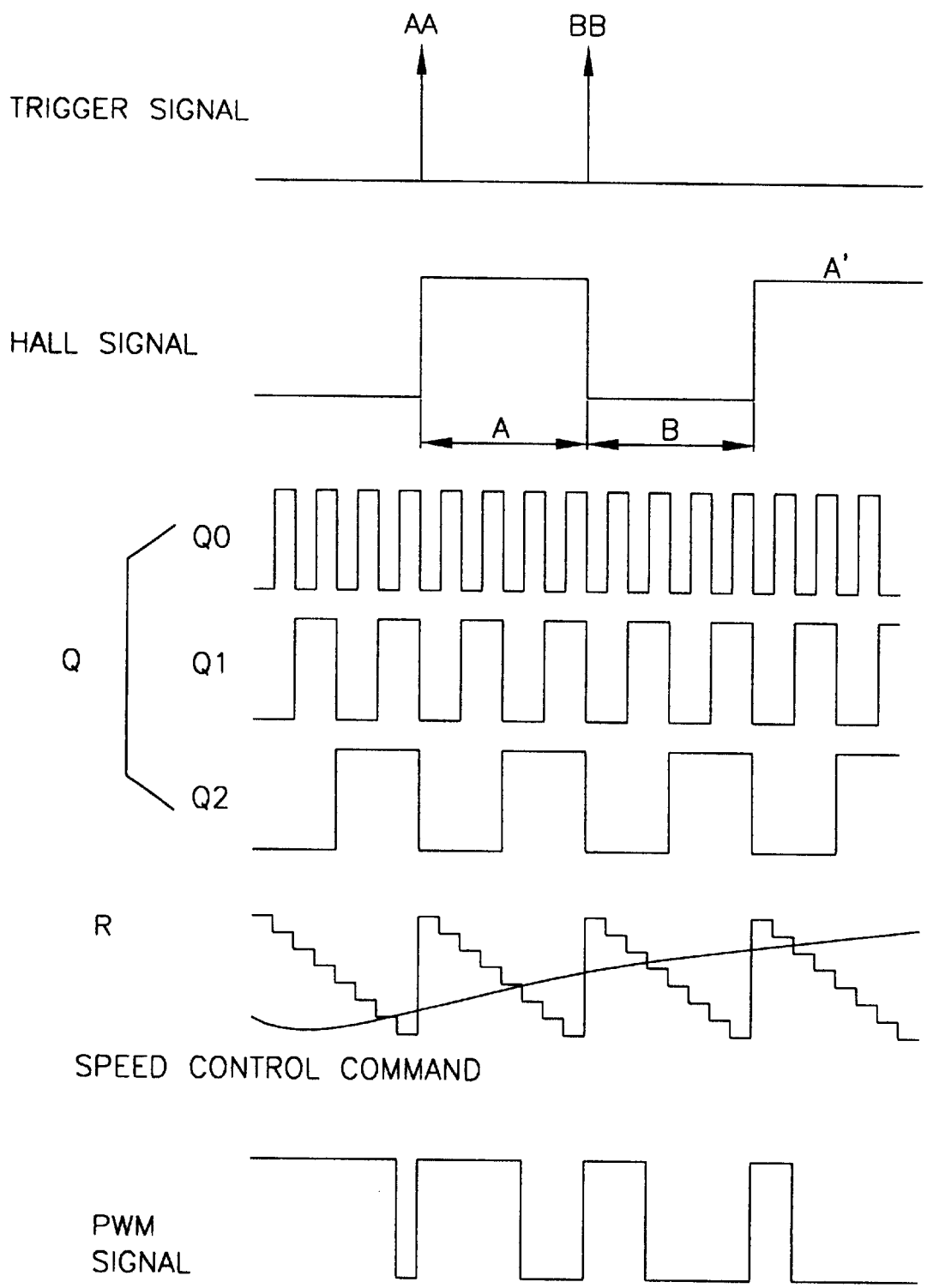
FIG. 5 is a waveform graph of the signals in the synchronous phase detecting unit and the PWM control unit in FIG. 2.

With reference to FIG. 5, the Hall signal has two phases A and B. When the first edge detecting unit (11) detects a change in the phase of the Hall signal, such as from a low voltage level changed to a high voltage level, the first edge detecting unit (11) sends out a trigger signal (denoted by AA) to activate the first counter (12). When the phase of the Hall signal changes again, such as from high voltage level to low voltage level (from phase A to phase B), a trigger signal (denoted by BB) disables the first counter (12), therefore the first counter stops counting at a counted value X. Then the value X is fed into and stored in the first toggle register (13). Thus the period of phase A of the Hall signal is represented to be N multiplied by X clocks (N×X).

For a rotating motor, time periods of two adjacent phases of the Hall signal are approximately the same, therefore the time period of phase B is approximately the same as phase A, therefore the time period of phase B is able to be estimated as N×X clock signals.

At the moment that the phase of the Hall signal changes from A to B, the counting value X is fed into the second counter (14) from the first toggle register (13), and then the second counter (14) is set to count once per X clock signals. Meanwhile, the trigger signal BB activates the second counter (14) to count. Simultaneously, the first counter (12) is reset to zero and starts to count again.

Because the duration of phase B is approximately the same as N×X clock signals, when the counting value in the second counter (14) reaches N−1, the phase of the Hall signal is ready to change again (from phase B to phase A'). Therefore, the output signal of the second counter (14) is synchronized with the Hall signal, and is suitable to apply in the PWM control circuit (20) to control a PWM signal so as to synchronize the Hall signal with the PWM signal.

In the following description, the present invention is applied in a motor control circuit for providing a PWM signal that is synchronized with the Hall signal.

Figure 6:
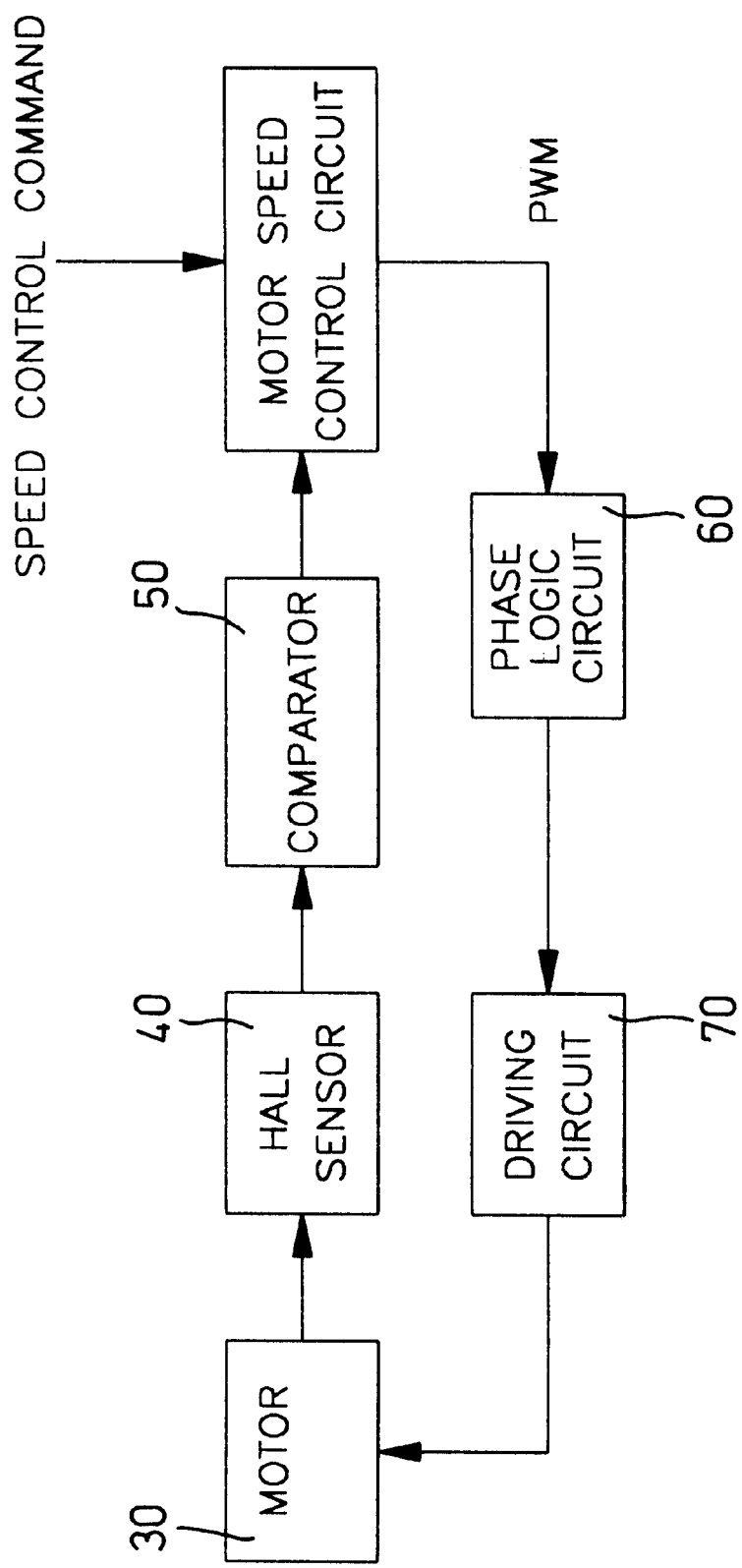
FIG. 6 is a block diagram of the present invention used to control a motor.
Figure 7:
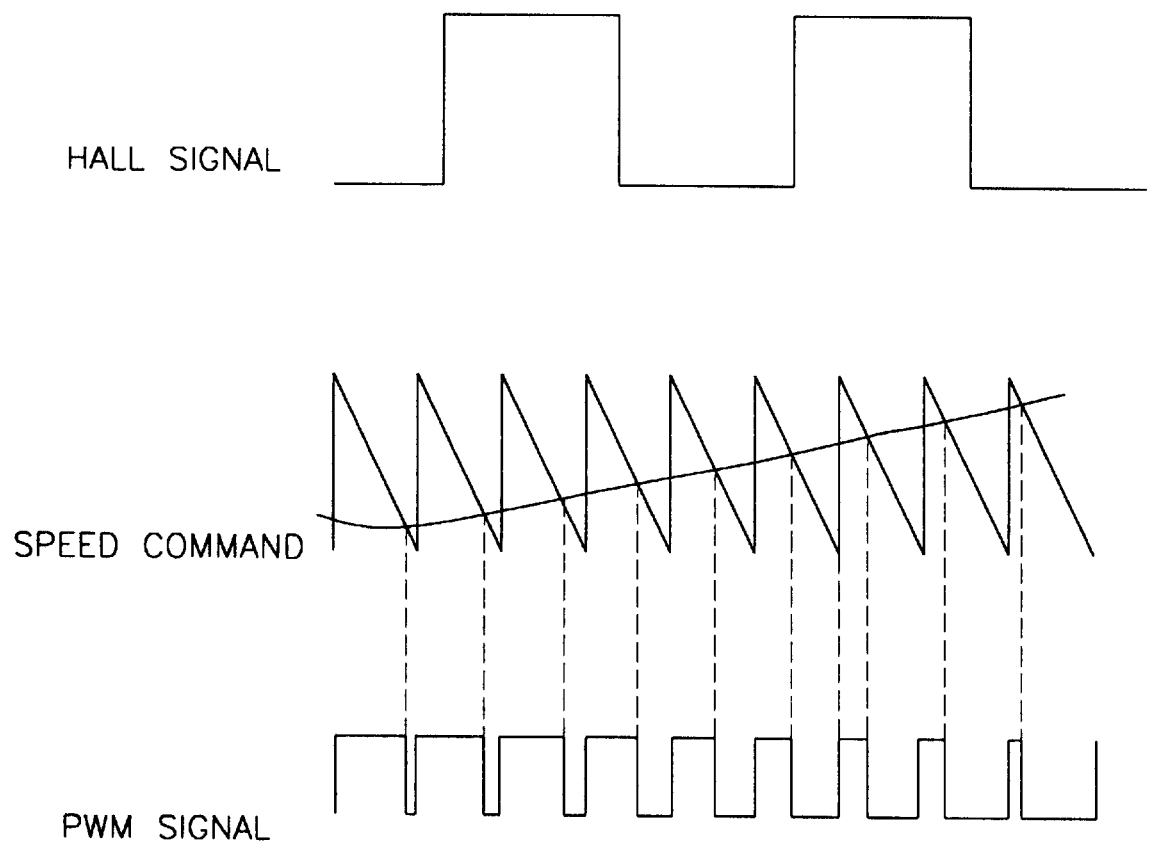
FIG. 7 is a wave form graph of a conventional PWM motor control techniques.

With reference to FIG. 6, the whole motor control circuit comprises a motor (30), a Hall sensor (40), the motor speed control circuit in accordance with the present invention, a comparator (50), a phase logic circuit (60), and a driving circuit (70). The Hall sensor (40) is connected to the motor (30). The motor speed control circuit in accordance with the present invention is connected to the Hall sensor (40) via the comparator (50). The phase logic circuit (60) is connected to the motor speed control circuit. The driving circuit (70) is connected to the phase logic circuit (60) and the motor (30).

Because known speed control commands have three types, i.e. analog voltage command, digital command and PWM command, the motor speed control circuit has three embodiments respectively to correspond to each kind of speed control command.

Figure 2:
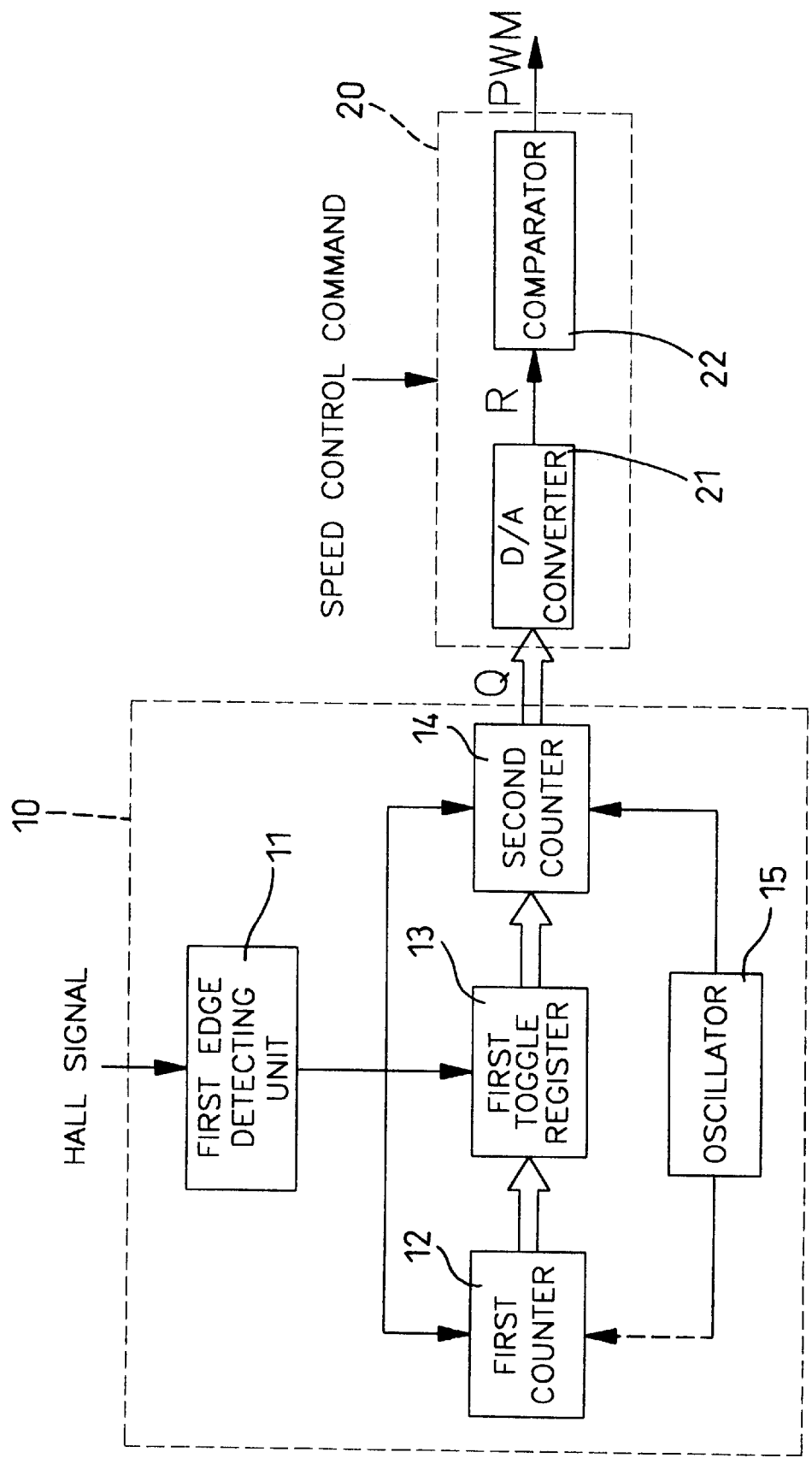
FIG. 2 is a block diagram of a first embodiment of a synchronous phase detecting unit and a PWM control unit in accordance with the present invention.

With reference to FIGS. 2 and 5, the speed control command is an analog voltage command, wherein the PWM control unit (20) comprises a digital to analog (D/A) converter (21) connected to the output of the second counter (14), and a comparator (22) connected to the D/A converter (21).

When the first edge detecting unit (11) detects a change in the phase of the Hall signal (shown in FIG. 5), such as from a low voltage level changed to a high voltage level (phase A), the first edge detecting unit (11) sends out a trigger signal (denoted by AA) to activate the first counter (12), wherein the first counter (12) is set to count once per N clock signals. When the phase of the Hall signal changes again, such as from phase A to phase B, the first counter (12) stops counting at a counted value X. Then the value X is fed into and stored in the first toggle register (13). Thus the period of phase A of the Hall signal is represented to be N multiplied by X clocks (N×X).

Since time periods of two adjacent phases of the Hall signal are approximately the same, the time period of phase B is approximately equal to phase A, and the time period of phase B is able to be estimated as N×X clocks.

At the moment that the phase of the Hall signal changes from A to B, the counting value X is fed into the second counter (14) from the first toggle register (13), and then the second counter (14) is set to count once per X clocks. Simultaneously, the first counter (12) is reset to zero and starts to count again. Because the duration of phase B is approximately the same as N×X clock signals, when the counting value in the second counter (14) reaches N−1, the phase of the Hall signal is ready to change again (from phase B to phase A'). The second counter (14) has output signals (Q) which represent the counting thereof, and those signals are further inputted into the D/A converter (21). The D/A converter (21) converts the output signal (Q) into an analog signal (R) and inputs it to the comparator (22). The comparator (22) compares the analog signal (R) with the speed control command so as to obtain the PWM signal. Since the output signal (Q) is synchronized with the Hall signal, the PWM signal is also synchronized with the Hall signal. Thus the audible noise is effectively reduced.

Figure 3:
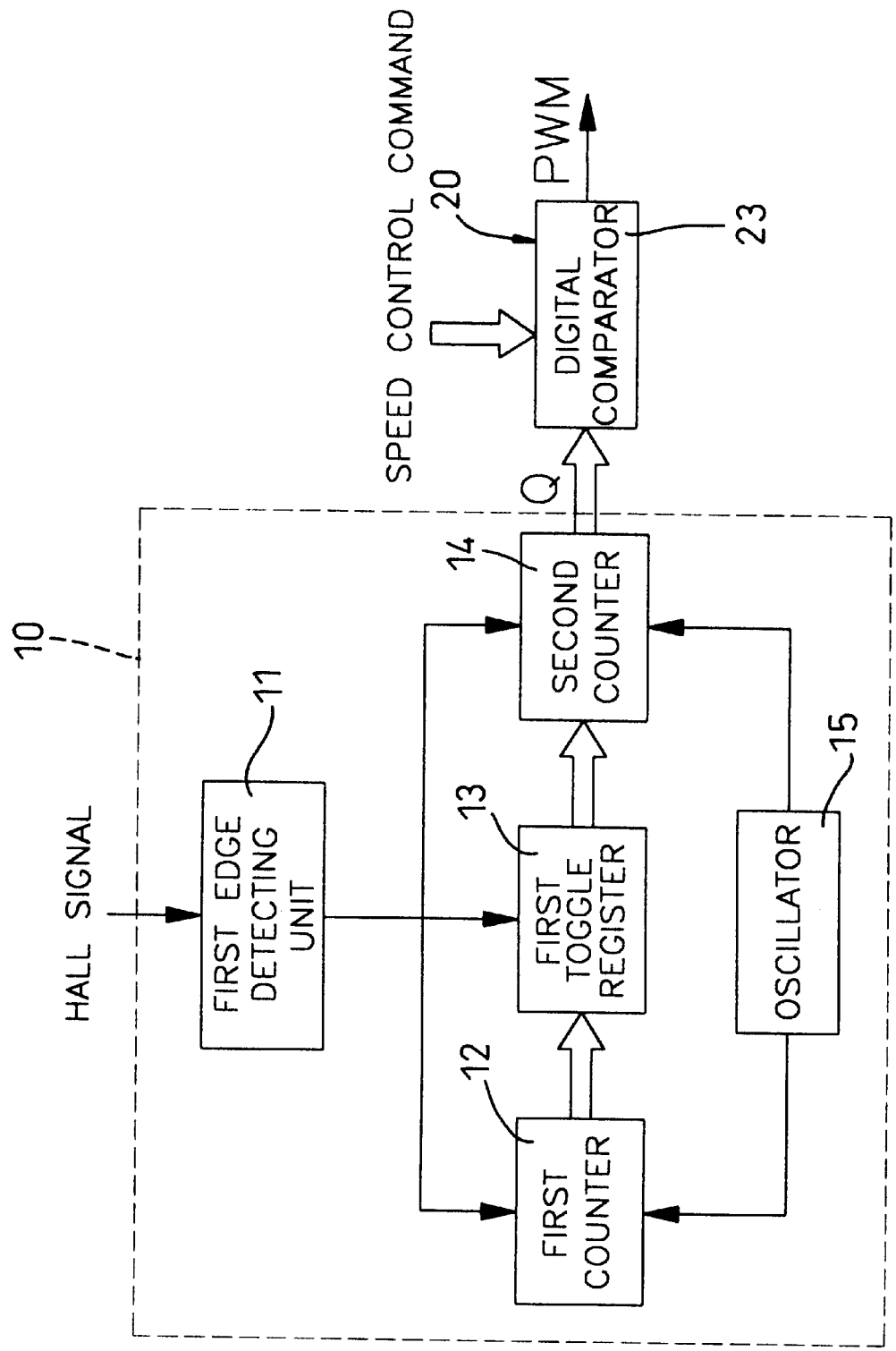
FIG. 3 is a block diagram of a second embodiment of a synchronous phase detecting unit and a PWM control unit in accordance with the present invention.

With reference to FIG. 3, the speed control command is a digital command, wherein the synchronous phase detecting unit (10) is the same as shown in FIG. 2, and the PWM control unit (20) is made up of a digital comparator (23). Because the output signal (Q) of the second counter (14) is in digital form, the output signal (Q) is directly compared with speed control command. The digital comparator (23) is connected to the second counter (14) to receive the digital value and compares the digital value with the speed control command to obtain the PWM signal.

Figure 4:
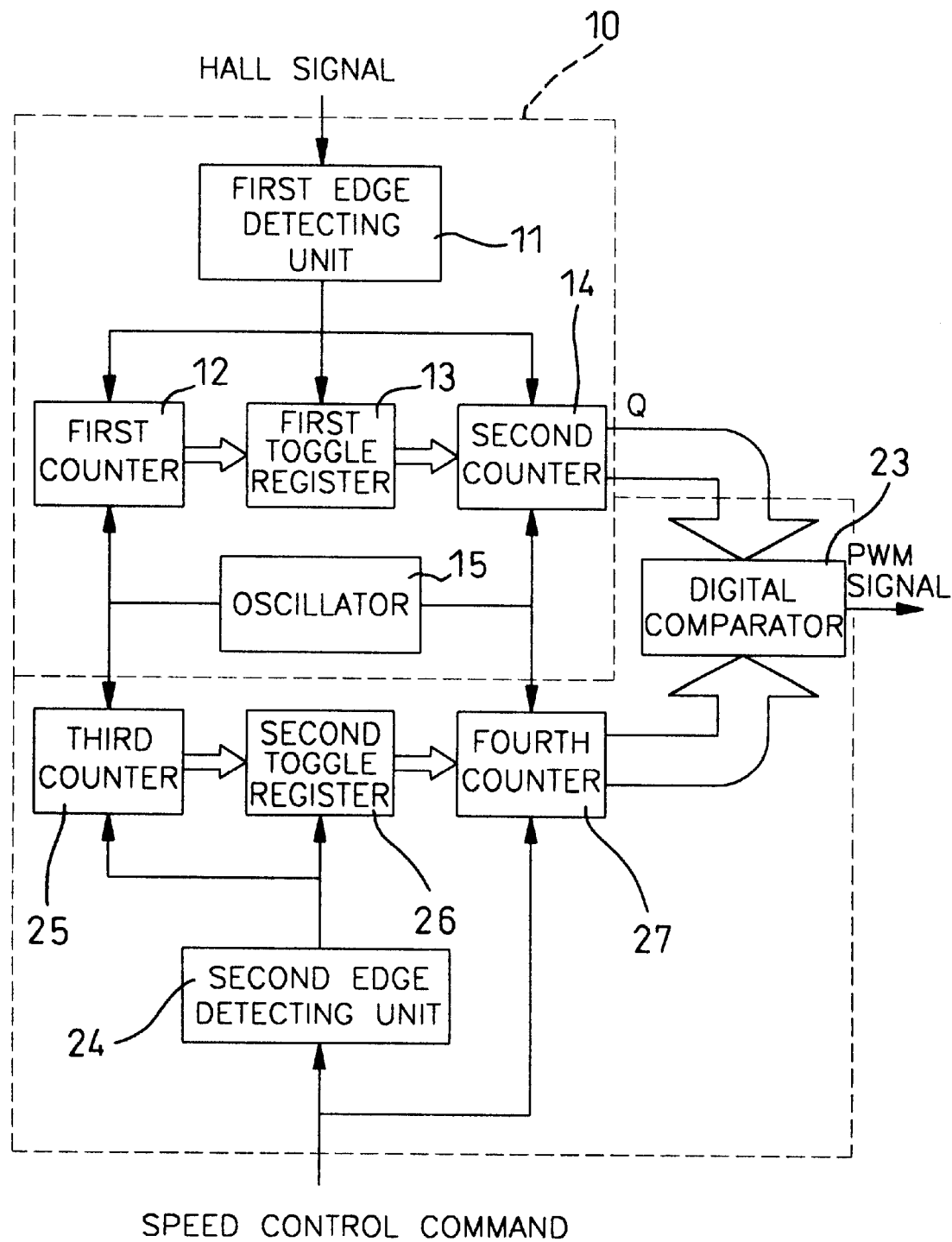
FIG. 4 is a block diagram of a third embodiment of a synchronous phase detecting unit and a PWM control unit in accordance with the present invention.

With reference to FIG. 4, the speed control command is a PWM command, wherein the synchronous phase detecting unit (10) is the same as shown in FIG. 2. The PWM control unit comprises a third counter (25), a second toggle register (26), a fourth counter (27), a second edge detecting unit (24) and a digital comparator (23'). The third counter (25) and the fourth counter (27) are connected to the oscillator (15), so that the counting frequency is the same as the frequency of first counter (12) and the second counter (14). The second edge detecting unit (24) is connected with the third counter (25) and the second toggle register (26), and receives the speed control command that is also inputted to the fourth counter (27).

The second edge detecting unit (24) in this preferred embodiment is a rising edge detecting unit. When the voltage level of the PWM command is changed from low to high, the second edge detecting unit (24) detects the phase variation and activates the third counter (25). The third counter (25) is set to count once per N clocks. When the phase of the PWM command changes again, the third counter (25) stops counting at counting value Y, meanwhile the value Y is fed to the second toggle register (26). The fourth counter (27) is set to count once per Y clocks. The fourth counter (27) is activated by the PWM command during high voltage level period and outputs a digital value. The output digital value from the fourth counter (27) is compared with the digital value (Q) outputted from the second counter (14) by the digital comparator (23') so as to obtain a PWM signal to control the motor.

In the foregoing description, the rising edge detecting unit is able to be replaced by a falling edge detecting unit. The PWM signal outputted from the PWM control unit (20) is synchronized with the Hall signal, thus even when the motor operates slowly, the audible noises are efficiently reduced.

The invention may be varied in many ways by a person skilled in the art. Such variations are not to be regarded as a departure from the spirit and scope of the invention, and all such modifications are intended to be included within the scope of the following claims.

What is claimed is:

1. A motor speed control circuit having a synchronous PWM signal, the motor speed control circuit comprising:

a synchronous phase detecting unit (10) adapted to connect to a Hall sensor for receiving a Hall signal and detecting a phase change in the Hall signal; and a pulse width modulation (PWM) control unit (20) having a first input terminal connected to the synchronous phase detecting unit (10) and a second input terminal adapted to receive a speed control command, whereby the synchronous phase detecting unit (10) detects the phase variation of the Hall signal so as to output a digital value synchronized with the Hall signal into the PWM control unit (20), and then the PWM control unit (20) compares the digital value with the speed control command so as to output a PWM signal that is synchronized with the Hall signal.

2. The motor speed control circuit as claimed in claim 1, wherein the synchronous phase detecting unit (10) comprises:

a first edge detecting unit (11) adapted to connect to the Hall sensor for detecting the phase variation of the Hall signal;

a first counter (12) connected to the first edge detecting unit (11) for counting a duty cycle of the Hall signal;

a first toggle register (13) having a first input terminal and a second input terminal respectively connected to the first counter (12) and the first edge detecting unit (11);

a second counter (14) connected to the first toggle register (13) and outputting a digital value; and an oscillator (15) connected to the first counter (12) and the second counter (14), and simultaneously providing clock signals to the first counter (12) and the second counter (14).

3. The motor speed control circuit as claimed in claim 2, wherein the PWM control unit (20) comprises:

a digital to analog (D/A) converter (21) connected to the second counter (14) for converting the digital value outputted from the second counter (14) into an analog signal; and a comparator (22) connected to the D/A converter (21) for comparing the analog signal from the D/A converter (21) with the speed control command so as to obtain the PWM signal, wherein the speed control command is an analog voltage command.

4. The motor speed control circuit as claimed in claim 2, wherein the PWM control unit (20) is made up of a digital comparator (23) that has a first input terminal connected to the second counter (14), and a second input terminal for receiving the speed control command, wherein the speed control command is a digital command.

5. The motor speed control circuit as claimed in claim 2, wherein the PWM control unit (20) comprises:

a second edge detecting unit (24) for receiving the speed control command and detecting a phase variation of the speed control command, wherein the speed control command is a PWM command;

a third counter (25) connected with the oscillator (15) and the second edge detecting unit (24);

a second toggle register (26) connected with the third counter (25) and the second edge detecting unit (24);

a fourth counter (27) connected with the oscillator (15) and second toggle register (26), wherein the fourth counter (27) is enabled to count by the speed control command; and a digital comparator (23') connected to the second counter (14) and the fourth counter (27) to compare the digital value outputted from the second counter (14) with a digital value from the fourth counter (27) so as to obtain the PWM signal.

6. The motor speed control circuit as claimed in claim 5, wherein the second edge detecting unit (24) is a rising edge detecting unit and the second edge detecting unit (24) detects the voltage level of the speed control command from high to low.

7. The motor speed control circuit as claimed in claim 5, wherein the second edge detecting unit (24) is a falling edge detecting unit and the second edge detecting unit (24) detects the voltage level of the speed control command from low to high.

* * * * *